United States Patent
Af Ursin

(10) Patent No.: US 8,350,424 B2
(45) Date of Patent: Jan. 8, 2013

(54) DYNAMOELECTRIC MACHINE

(75) Inventor: Ilkka Af Ursin, Turku (FI)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/125,759

(22) PCT Filed: Sep. 14, 2009

(86) PCT No.: PCT/EP2009/061841
§ 371 (c)(1),
(2), (4) Date: Apr. 22, 2011

(87) PCT Pub. No.: WO2010/046182
PCT Pub. Date: Apr. 29, 2010

(65) Prior Publication Data
US 2011/0227431 A1    Sep. 22, 2011

(30) Foreign Application Priority Data

Oct. 24, 2008   (DE) .......................... 10 2008 053 090

(51) Int. Cl.
*H02K 9/20* (2006.01)
(52) U.S. Cl. .......... 310/64; 310/54; 310/58; 165/104.33
(58) Field of Classification Search ............... 310/64, 310/58–59
See application file for complete search history.

(56) References Cited

U.S. PATENT DOCUMENTS

| | | | |
|---|---|---|---|
| 1,700,840 A | | 2/1929 | Gay |
| 3,715,610 A | * | 2/1973 | Brinkman ........................ 310/54 |
| 3,801,843 A | | 4/1974 | Corman et al. |
| 4,246,057 A | * | 1/1981 | Janowski et al. ............. 156/150 |
| 4,406,959 A | * | 9/1983 | Harano et al. .................. 310/58 |
| 5,184,675 A | * | 2/1993 | Gardner ........................ 165/184 |
| 5,603,377 A | * | 2/1997 | Fujii et al. ..................... 165/117 |
| 5,808,387 A | * | 9/1998 | Akachi et al. ................... 310/54 |
| 6,293,333 B1 | | 9/2001 | Ponnappan et al. |
| 7,102,267 B2 | * | 9/2006 | Gromoll et al. ............... 310/260 |
| 8,148,858 B2 | * | 4/2012 | Hassett et al. .................. 310/52 |

FOREIGN PATENT DOCUMENTS

| | | | |
|---|---|---|---|
| DE | 12 64 676 B | | 3/1968 |
| EP | 1 432 102 A2 | | 6/2004 |
| JP | 57-62754 | * | 4/1982 |
| JP | 9-74717 | * | 3/1997 |
| JP | 10 174371 A | | 6/1998 |
| JP | 2000-152563 | * | 5/2000 |

OTHER PUBLICATIONS

NEMA Enclosure Types, Ratings for "IP55 Enclosures", 2012.*

* cited by examiner

*Primary Examiner* — Burton Mullins
(74) *Attorney, Agent, or Firm* — Henry M. Feiereisen LLC

(57) ABSTRACT

The invention relates to a dynamoelectric machine (1) comprising a stator (2) and a rotor (3). At least the stator (2) has a winding system (4) which is arranged in grooves of the stator (2). Heat is transferred in a substantially radial direction on the front sides (6) of the stator (2) by means of heat pipes (5).

14 Claims, 5 Drawing Sheets

DYNAMOELECTRIC MACHINE

CROSS-REFERENCES TO RELATED APPLICATIONS

This application is the U.S. National Stage of International Application No. PCT/EP2009/061841, filed Sep. 14, 2009, which designated the United States and has been published as International Publication No. WO 2010/046182 A2 and which claims the priority of German Patent Application, Serial No. 10 2008 053 090.5, filed Oct. 24, 2008, pursuant to 35 U.S.C. 119(a)-(d).

BACKGROUND OF THE INVENTION

The invention relates to a dynamoelectric machine comprising a stator and a rotor, the stator having a winding system arranged in grooves of the stator, and the cooling system having heat pipes.

Dynamoelectric machines are equipped with an air or fluid cooling system in order to remove the losses of heat from lamination stacks of the stator and/or lamination stacks of the rotor as well as from the winding systems. These losses in dynamoelectric machines arise in particular from iron losses and eddy current losses. In order now to further improve the transporting of heat out of a dynamoelectric machine, heat pipes are used in dynamoelectric machines.

For example, the document U.S. Pat. No. 3,801,843 shows a plurality of arrangements of heat pipes in the lamination stack and grooves of a dynamoelectric machine.

Heat pipes consist in principle of a vacuum-tight sealed pipe which is provided on its inside with a capillary structure. An introduced working fluid (water or alcohol) is stored in the capillary structure as saturated steam as a consequence of the prevailing vacuum. The heat is now transported inside the heat pipes by evaporation and condensation. If heat energy is conveyed to a point of the heat pipes (evaporation zone), then the working fluid evaporates with the absorption of the energy. The steam now flows in the direction of the temperature gradient and condenses at the cooler points of the heat pipes with energy being discharged (condensation zone). The condensate returns into the evaporation zone under the capillary force and under gravity.

Heat pipes are manufactured as pipes, and in particular round pipes, but also as rectangular flat heat pipes. Heat pipes are advantageously arranged in such a way that the evaporation zone is arranged beneath the condensation zone. In the opposite situation, i.e. when the evaporation zone is at the top and the condensation zone at the bottom, the internal capillary force must work counter to gravity.

A dynamoelectric machine in which in particular the end windings are cooled by heat pipes is known from the document JP 10174371 A.

In closed dynamoelectric machines with air cooling, the factor that limits efficiency is often the heating of the rotor. Because the type of protection requires a closed construction of the dynamoelectric machine, the heat must be discharged from the rotor to the cooling air via a protective pipe or the like. The losses of heat from the rotor must now be discharged onto the protective pipe by convection, as is the heat from the winding system, and in particular from the end windings. The protective pipe which is integrated on the bearing pipe is cooled from the outside by cooling air. The following disadvantages arise as a result. The temperature difference between the inside of the protective pipe and the cooling air that flows around the protective pipe is relatively great.

The following factors play a role in the heat transfer: the air speed on both sides, inside and outside the protective pipe, the amount of air, the transfer surface area and the thermal conductivity of the material between the two zones.

SUMMARY OF THE INVENTION

Against this background, the object of the invention is, in the case of a closed electrical machine with air cooling, to improve the dissipation of heat from the rotor and the dissipation of heat from the winding system of the stator without in so doing interfering with the essential principle of the construction of the dynamoelectric machine.

The object that has been set is achieved by a dynamoelectric machine comprising a stator and a rotor, wherein at least the stator has a winding system arranged in grooves of the stator and forms end windings on the end sides of the stator, and wherein heat is transported essentially radially to the end sides of the stator via heat pipes.

As a result of the arrangement of the heat pipes in an essentially radial arrangement on the end sides of the stator in a closed dynamoelectric machine, the type of protection of the dynamoelectric machine, for example IP55, is moreover ensured. At the same time, a sufficient cooling performance is ensured via the heat pipes arranged on the end sides of the stator, from the inside of the protective pipe to the outside. The losses of heat from the rotor and the winding system of the stator, iron losses from the lamination stacks and losses from the end windings are thus absorbed by the evaporation zone of the heat pipes and transported outside into the condensation zone through the protective pipe. The temperature difference between the inside of the dynamoelectric machine and the outside is thus reduced without the type of protection of the dynamoelectric machine being restricted thereby.

Furthermore, no significant structural modifications need to be made to the dynamoelectric machine as only the protective pipe needs to be configured with appropriate holes which essentially correspond to the cross section of the heat pipes. Depending on the number of holes in the protective pipe, a plurality of heat pipes can accordingly be provided.

The protective pipe is also advantageously a thermally conductive material so that as a result heat is additionally transported from the region enclosed by the protective pipe and the cooling is thus supported by the heat pipes.

In order to reduce the reduced effectiveness of the heat pipes in the lower part of the dynamoelectric machine, in other words where the capillary forces must work against gravity, the number of heat pipes can be increased in order to ensure the same cooling performance as in the upper part of the dynamoelectric machine.

As an alternative, special heat pipes need to be provided on the radially lower side of the protective pipe, in other words when capillary force needs to act counter to gravity, and also ensure a sufficient transporting of heat owing to their capillary structure.

At least the evaporation zone and/or the condensation zone is advantageously provided with a mesh that increases the surface area of the evaporation zone and the condensation zone. The mesh is advantageously configured as a metal mesh, in particular a wire mesh, which is additionally thermally conductive and, by virtue of its mesh-like structure, also ensures a swirling of the flow of air in the evaporation zone or the condensation zone, respectively.

These meshes on the end portions of the heat pipes result in turbulent flows on the air flows surrounding these end portions. This turbulent flow is characterized by apparently random, volatile motion of the fluid particles which is usually three-dimensional. The absorption of heat from a cooling agent, for example a flow of air, as well as the transfer of heat from the heat pipes to the cooling agent, is thus significantly improved.

These meshes are in particular interwoven wires which are thermally coupled to the heat pipes. The internal mesh size of these meshes can be chosen at will but should in any case permit air to flow through the mesh.

The rotor of the dynamoelectric machine can be configured as a short-circuit rotor with a corresponding short-circuit cage, wherein in particular the short-circuit ring has blade-like formations on the end sides of the rotor. When the rotor turns, air circulates inside the protective pipe and the air is thus further swirled, which contributes to making the heat inside the protective pipe uniform.

In an advantageous embodiment, axial recesses in the rotor moreover not only allow an air circuit to be formed on the end sides but also allow an air circuit to be formed over the axial length of the rotor by these recesses that extend axially, so that a uniform temperature is established between the two end sides of the rotor too.

Inter alia, the iron losses from the rotor are thus advantageously brought from the rotor into the end side portions of the dynamoelectric machine.

In a further advantageous embodiment, the evaporation zone and condensation zone of at least some heat pipes are situated with their mesh axially aligned with the cooling channels that extend in the lamination stack of the stator or the lamination stack of the rotor respectively so that there is additional support for the absorption or transmission of heat by in particular enforced axial cooling in this region, which improves the efficiency of the whole cooling device.

The bearing shield can likewise be incorporated in the inner cooling circuit and is advantageously provided with cooling ribs at least in this portion, and the heat can thus also be transmitted to the ambient air via the air circulation and through the heat pipes.

BRIEF DESCRIPTION OF THE DRAWING

The invention and further advantageous embodiments of the invention are described in the basic exemplary embodiments shown in the drawings, in which.

DETAILED DESCRIPTION OF PREFERRED EMBODIMENTS

Figure 1:
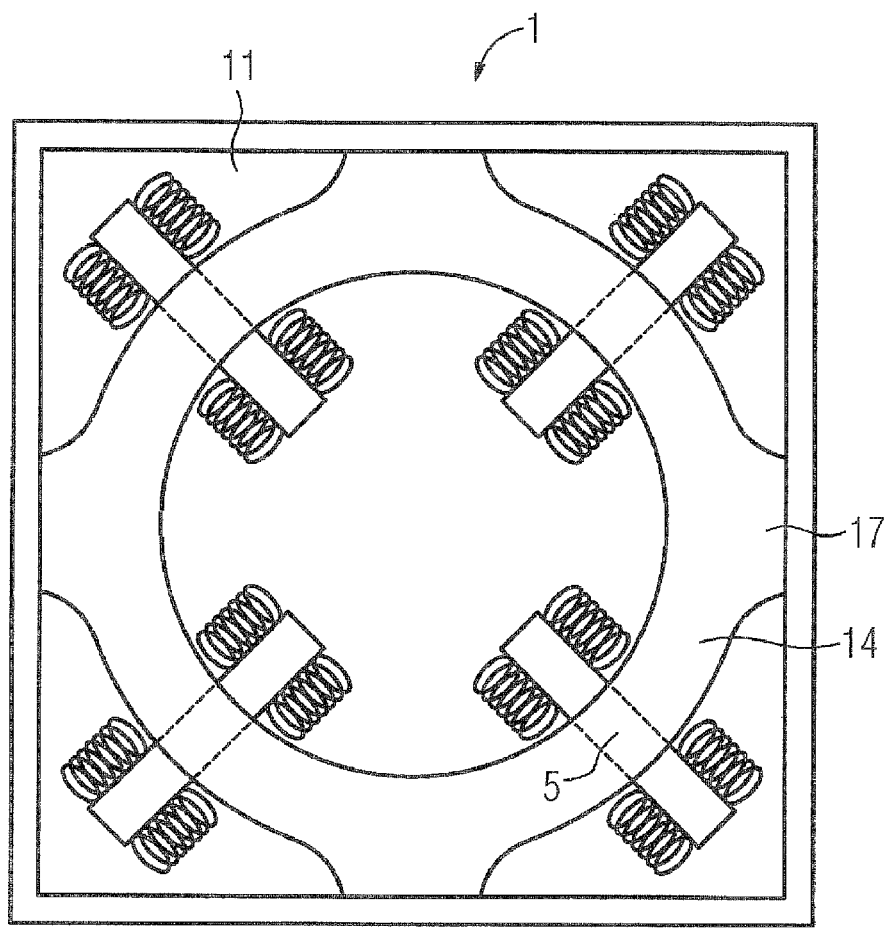
FIGS. 1 and 5 show a cross section of a dynamoelectric machine.

FIG. 1 shows in a basic cross section a dynamoelectric machine 1 comprising a housing against which a protective pipe 14 is supported via supports 17. For the sake of clarity, neither the winding system 4 nor the rotor 3 have been shown in this FIG.

Figure 2:
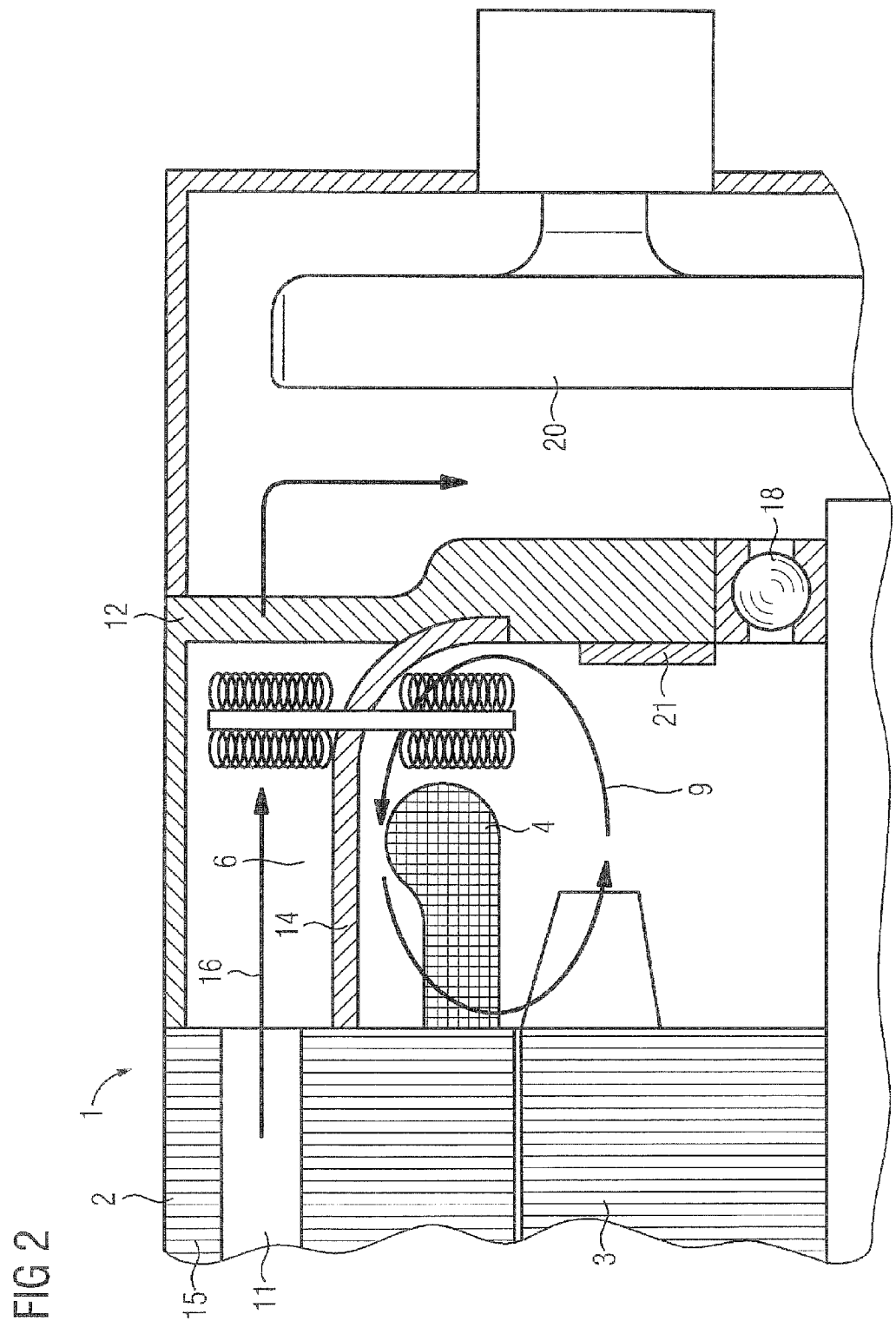
FIGS. 2 and 4 show a partial longitudinal section of a dynamoelectric machine.

The protective pipe 14 surrounds, as can also be seen clearly in FIG. 2, the electrically sensitive parts such as, for example, the winding system 4 with its end windings as well as the rotor 3 which rotates. The heat from the rotor 3 and the winding system 4 must now be conveyed to the outside via the protective pipe 14. This happens according to the invention by heat pipes 5, in this case four heat pipes 5, being arranged radially in the corners of the housing and having meshes 8 both in the end portions of the evaporation zones 19 of the heat pipes 5 and in the end portions of the condensation zones 7. These meshes 8 enlarge the heat absorption or transmission surface area and moreover ensure that the flow of air surrounding them is turbulent, so that the heat transmission or absorption is additionally improved.

The condensation zones 7 are here advantageously arranged so that they are axially aligned with the recesses 11 of the lamination stack 15 of the stator 2 which are configured as axial cooling channels. As a result of this axial ventilation of the lamination stack 15 of the stator 2, an additional passage through the mesh 8 of the condensation zone 7 is effected with a simultaneous increase in the heat transmission.

The protective pipe 14 extends from the lamination stack 15 of the stator 2 to the bearing shield 12 and thus forms a sealed air space. The winding system 4 is thus sealed from the outside and hence complies with the necessary protection class. A forced convection now takes place within this sealed air space, in particular propelled by an additional fan, in the case of a short-circuit rotor by fan blades on the short-circuit ring. In so doing, the air is circulated by force and thus flows around and through the end windings, the bearing shield and in particular the mesh 8 of the evaporation zone. A uniform absorption of heat in this region is hereby occasioned and the difference in heat between the different regions inside the protective pipe and outside is significantly reduced.

Figure 4:
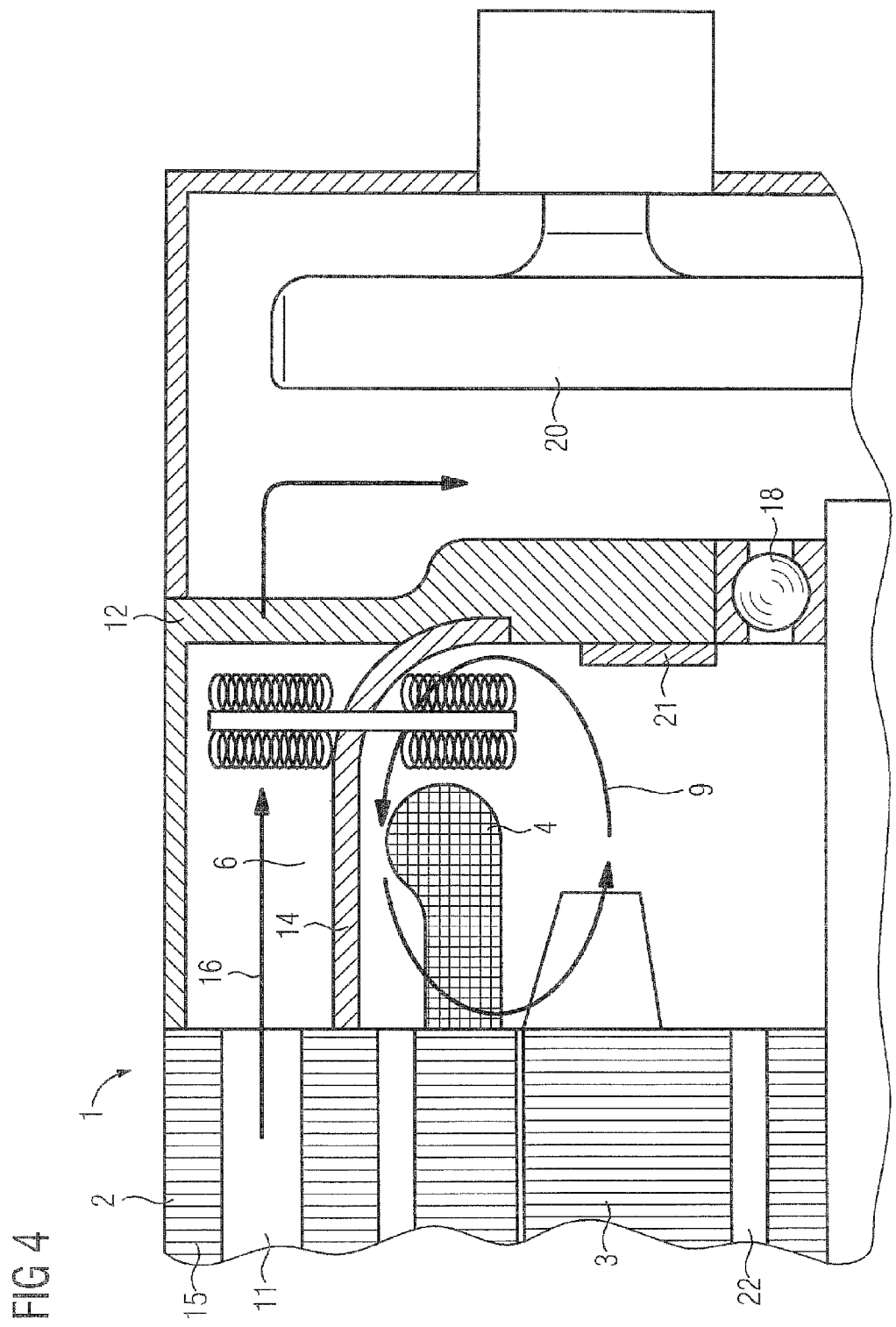

The bearing shield 12 which holds the bearing 18 advantageously has cooling ribs 21 which also project into the cooling circuit inside the protective pipe 14 and/or inside the cooling flow 16. The rotor 3 can, according to FIG. 4, likewise be configured with axial cooling channels 22 so that a cooling circuit is also established from one end side of the dynamoelectric machine to the other end side without leaving the region of the protective pipe 14.

A dynamoelectric machine 1 is thus obtained which has a high cooling efficiency with a closed mode of construction and which requires only few structural measures relative to the previously known dynamoelectric machine.

These consist simply of arranging heat pipes 5 at predetermined distances inside a protective pipe 14. The heat pipes 5 are arranged in corresponding holes of the protective pipe 14 but in any case in order to be able to comply, for example, with the type of protection IP55, the holes in which the heat pipes 5 are inserted are sealed with an additional sealant.

Figure 5:
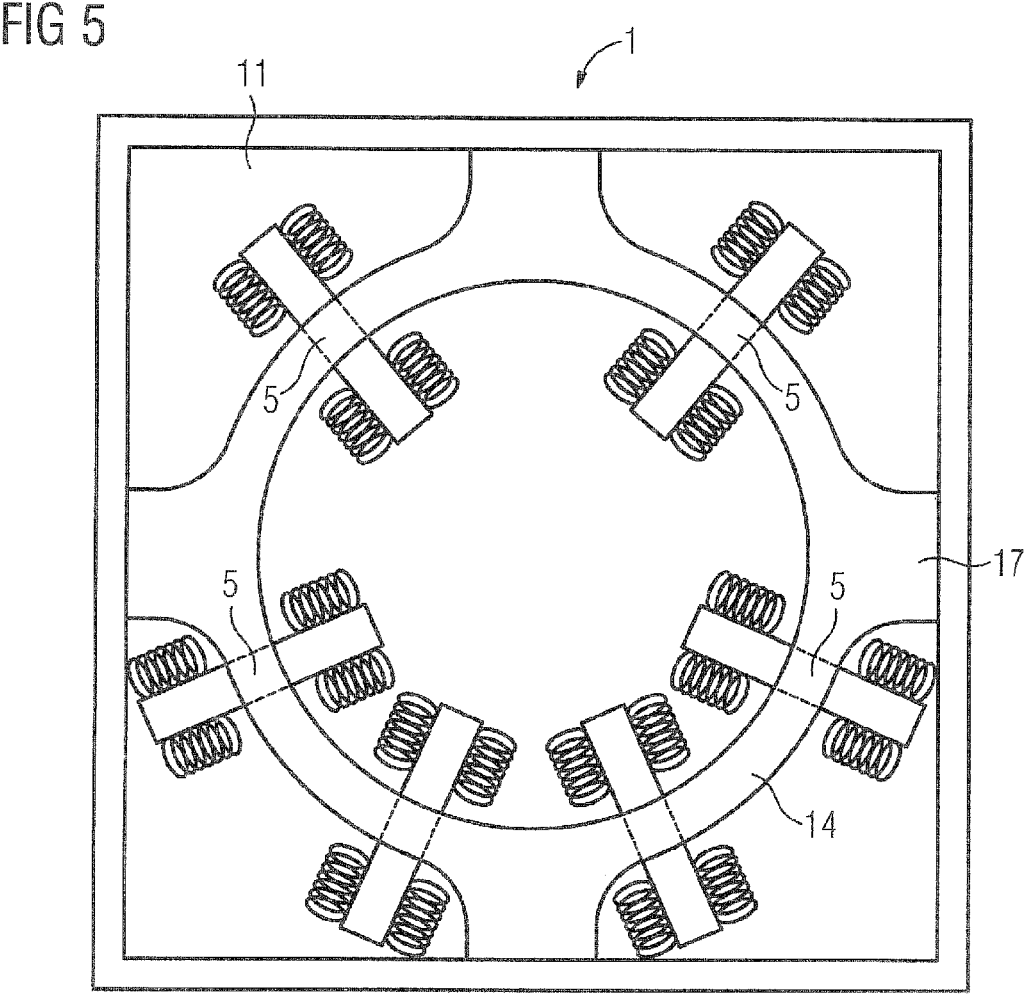

FIG. 5 shows in a basic cross section an arrangement of heat pipes 5 in a presentation that is horizontal with respect to its axis, in which according to the invention the capillary forces of the heat pipes 5 must work against gravity and hence reduce the cooling efficiency.

In order to avoid this, the number of heat pipes 5 in the lower region is increased and/or provided with heat pipes 5 which have a suitable capillary structure.

Figure 3:
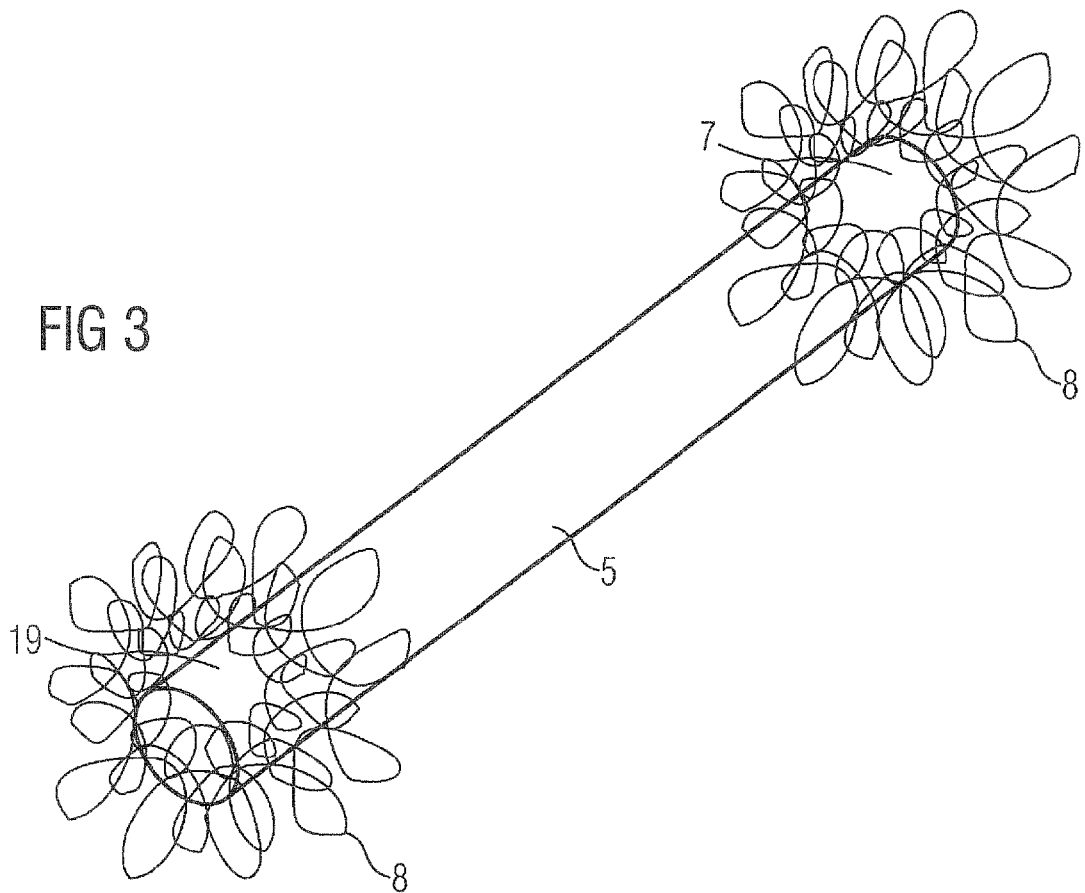
FIG. 3 shows a heat pipe.

FIG. 3 shows a heat pipe 5 with the end portions where the evaporation zone 19 and the condensation zone 7 are arranged. Each of these zones has a mesh 8 in order, on the one hand, to enlarge the heat transfer surface area and, on the other hand, to swirl this air flowing through the meshes 8 and hence make the heat absorption or transmission more efficient. These meshes 8 are thermally coupled to the end portions of the heat pipes 5 in order to allow the heat to be sent to this evaporation zone 19 or in order to be able to transmit the heat from the condensation zone 7 to the mesh 8.

Now advantageously a dynamoelectric machine 1 with a closed construction and sufficient cooling can be simply provided by arranging a protective pipe 14 around the critical components such as the winding, the end windings and the rotor, said protective pipe 14 having holes in which essentially radially arranged heat pipes 5 with a mesh 8 are arranged.

The protective pipe 14 on the end sides 6 of the stator 2 shields, optionally together with the bearing shield 12 and the shaft, respectively the end windings and the winding system, the rotor 3 etc. against environmental influences, in particular dirt and water.

The invention claimed is:

1. A dynamoelectric machine comprising:
   a stator having axial recesses and grooves for receiving a winding system which forms end windings on end sides of the stator;
   a rotor interacting with the stator; and
   heat pipes, each having an evaporation zone and a condensation zone and transporting heat essentially radially from the end sides of the stator, said heat pipes having a mesh at an end portion of the evaporation zone and/or of the condensation zone to increase a surface area of the evaporation zone and/or of the condensation zone, said mesh being thermally conductive and configured to realize a swirling of a flow of air in the evaporation zone and/or condensation zone,
   wherein the mesh of the condensation zone of each of the heat pipes is arranged in axial alignment with the recesses.

2. The dynamoelectric machine of claim 1, wherein the recesses form cooling channels.

3. The dynamoelectric machine of claim 2, wherein cooling air is generated through the recesses of the stator in a forced or natural manner.

4. The dynamoelectric machine of claim 1, wherein the mesh is a wire mesh.

5. The dynamoelectric machine of claim 1, wherein the cooling circuit is an air cooling circuit.

6. The dynamoelectric machine of claim 1, wherein the rotor and at least one end winding arranged on an end side of the stator are disposed in the cooling circuit.

7. The dynamoelectric machine of claim 1, wherein the thermally conductive material is metal.

8. The dynamoelectric machine of claim 1, constructed in closed construction in accordance with Ingress Protection Code IP55, which limits ingress of dust and protects against low-pressure water jets.

9. A dynamoelectric machine, comprising:
   a stator having a lamination stack and grooves for receiving a winding system which forms end windings on end sides of the stator;
   a rotor interacting with the stator;
   heat pipes, each having an evaporation zone and a condensation zone and transporting heat essentially radially from the end sides of the stator, said evaporation zone being arranged within a closed cooling circuit of the dynamoelectric machine, and said heat pipes having a mesh at an end portion of the evaporation zone and/or of the condensation zone to increase a surface area of the evaporation zone and/or of the condensation zone, said mesh being thermally conductive and configured to realize a swirling of a flow of air in the evaporation zone and/or condensation zone,
   at least one bearing shield disposed at each of the end sides of the stator and having cooling ribs which project into the closed cooling circuit, and
   a protective pipe disposed at each of the end sides of the stator, said protective pipe extending from the lamination stack of the stator to the bearing shield and penetrating the heat pipes such that the evaporation zone of each of the heat pipes is disposed radially inside the protective pipe and the condensation zone of each of the heat pipes is situated outside the protective pipe.

10. The dynamoelectric machine of claim 9, wherein the mesh is a wire mesh.

11. The dynamoelectric machine of claim 9, wherein the cooling circuit is an air cooling circuit.

12. The dynamoelectric machine of claim 9, wherein the rotor and at least one end winding arranged on an end side of the stator are situated in the cooling circuit.

13. The dynamoelectric machine of claim 9, wherein the thermally conductive material is metal.

14. The dynamoelectric machine of claim 9, constructed in closed construction in accordance with Ingress Protection Code IP55, which limits ingress of dust and protects against low-pressure water jets.

\* \* \* \* \*